April 8, 1930. I. COWLES 1,753,741
SELF HEATING DEVICE SUCH AS SOLDERING IRONS
Original Filed July 13, 1925 2 Sheets-Sheet 1
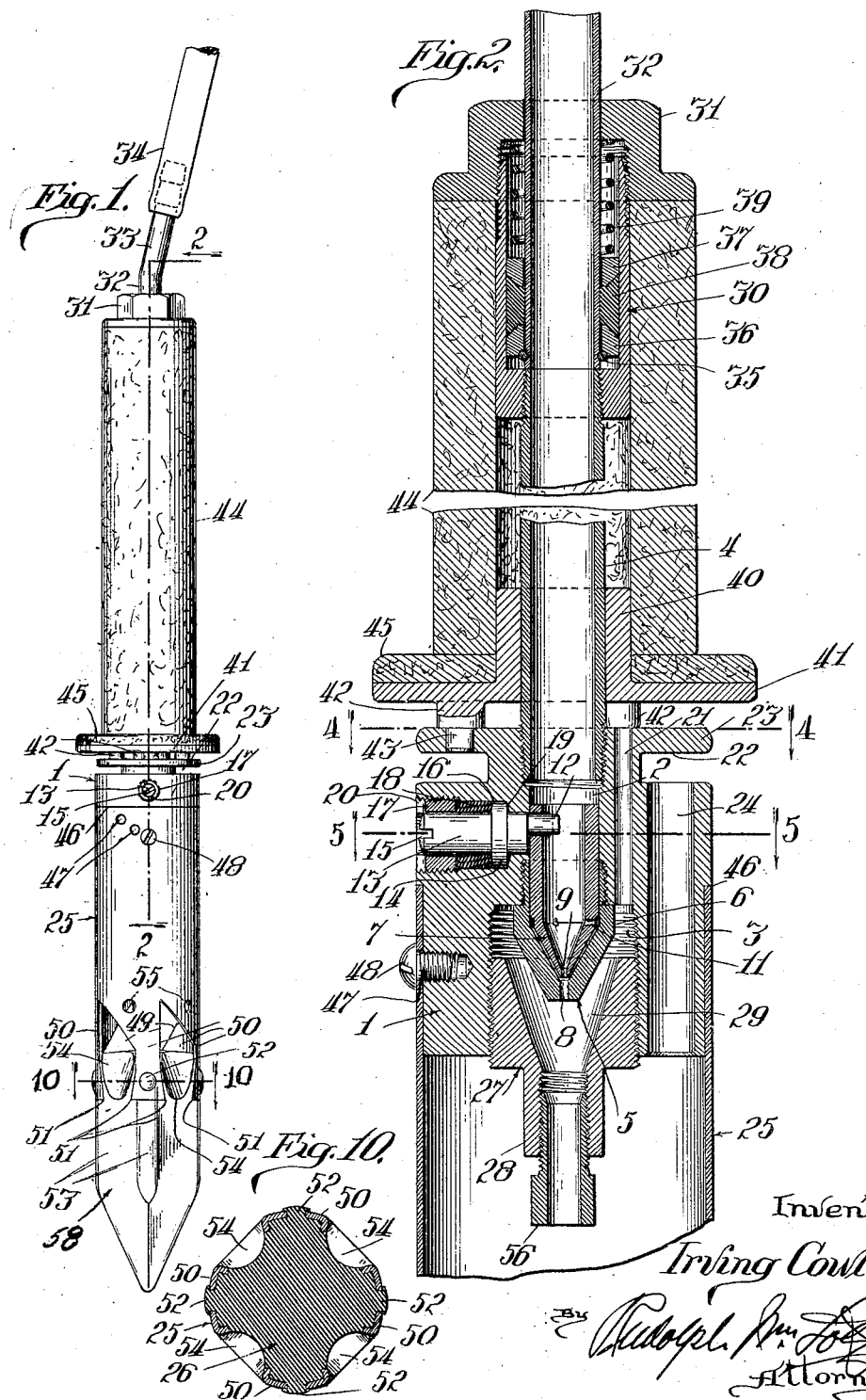

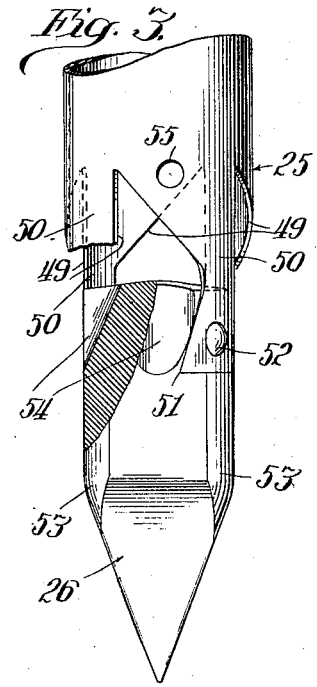
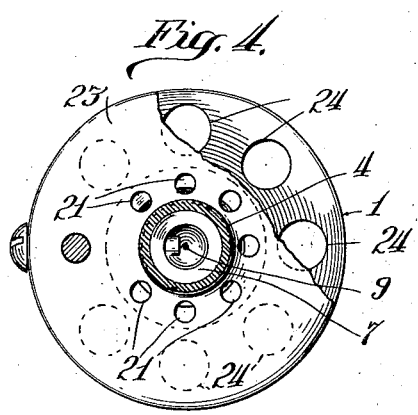
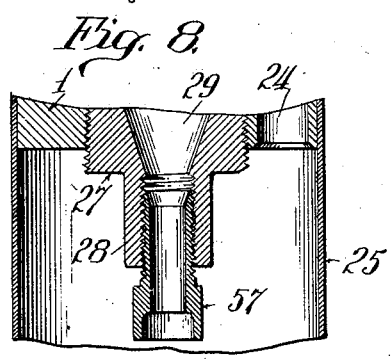
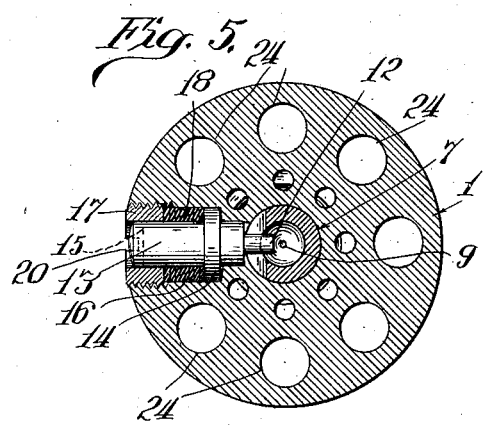
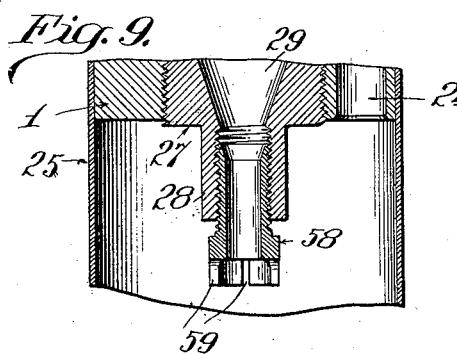
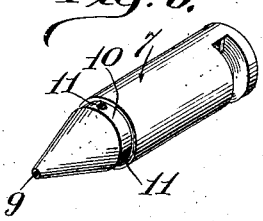

Patented Apr. 8, 1930

1,753,741

UNITED STATES PATENT OFFICE

IRVING COWLES, OF DETROIT, MICHIGAN, ASSIGNOR TO UNION BANK OF CHICAGO, OF CHICAGO, ILLINOIS, A CORPORATION OF ILLINOIS, TRUSTEE

SELF-HEATING DEVICE SUCH AS SOLDERING IRONS

Application filed July 13, 1925, Serial No. 43,114. Renewed September 7, 1929.

This invention relates to gas-heating and gas-heated devices of the type wherein the gas is fed to a gas-burner constituting a part of the device to be heated, such, for example, as a soldering iron.

The particular objects of the invention are:—

1. To provide a gas-burner adapted for heating purposes of all kinds which may be easily and quickly adjusted to produce substantially perfect combustion of the gas fed thereto, and in which the limits of adjustment are such as to adapt the burner to the quality and pressure of the gas, on the one hand, and produce a relatively long jet of burning gas under the pressures at which gas is ordinarily fed from city mains and service pipes.

2. To provide a burner of the type aforesaid which, when used for heating a soldering tip or other device coupled with the burner for continuous heating, will not become extinguished by manipulation of the said tip or other device resulting in varying the curvatures of the gas-feed hose connecting the burner with the source of supply of fuel gas.

3. To provide a gas-burner of the type aforesaid wherein the gas flow is maintained always axially of the mixing chamber and fuel outlet to thereby permit of more perfect admixture of gas and air and impingement of the flame constantly upon a predetermined surface area of the unit, such as a soldering tip, to be heated thereby.

4. To provide a gas heated device, such as a soldering iron, including a combustion chamber, gas-burner and unit to be heated, occupying very small space and easily adjustable with respect to each other to vary the length of the combustion chamber and, accordingly, the distance of the unit to be heated from the discharge end of the burner to thereby regulate the normal temperature of the heated unit.

5. To provide a gas-heated device, such as a soldering iron, wherein the unit to be heated is so coupled with the wall or walls of the combustion chamber as to be inseparable therefrom under conditions of normal usage.

Other objects of the invention and the advantages of the same are hereinafter pointed out or will be fully understood from the following specification.

In the accompanying drawings, I have illustrated the invention as embodied in a soldering iron as exemplary of a very widely employed device adapted for gas-heating.

In said drawings:—

Fig. 1 is a side elevation of a soldering iron constructed in accordance with the invention.

Fig. 2 is a fragmentary central longitudinal section of the same on the line 2—2 of Fig. 1.

Fig. 3 is a fragmentary detail view in elevation, partly in section, of the lower end portion of the device.

Figs. 4 and 5 are transverse sections on the lines 4—4 and 5—5, respectively, of Fig. 2.

Figs. 6 and 7 are perspective views of a valve and a valve-operating member, respectively, of the device.

Figs. 8 and 9 are fragmentary longitudinal sections of the gas-burner portion of the device illustrating different types of burner tips employed.

Fig. 10 is a transverse section on the line 10—10 of Fig. 1.

The invention is illustrated as embodied in a soldering iron for the reason that devices of this class heated by fuel gas obtained from city service pipes have not heretofore been successful, so far as I am informed, because the low pressures at which gas is delivered from service pipes and the differences in quality and variations in pressures at different hours of the day have proven insurmountable obstacles to continuous successful operation. A condition incident to the use of soldering irons is that their positions when being used are greatly varied so that at times the jet of flame is delivered at an upward incline and at other times vertically or at downward inclines at almost any angle from horizontal to vertical. It has been found that upon changing the position of the device from a downwardly to an upwardly inclined position, the flame would extinguish and that when disposed vertically or substantially vertically, the jet of flame would not impinge upon the copper tip and, also, that a backflow of products of combustion would occur and either extinguish the flame or cause the same to become yellow and smoky.

To construct a gas-burner which will obviate the many difficulties which have, so far as I am informed, defeated success of soldering irons of the self-heating type to which the invention relates, proved to be a problem very difficult of solution because a seemingly insignificant variation in construction or adjustment caused such a vast difference in results, this being particularly true with respect to differences in quality of gas or of pressure or both so that a device that was thoroughly practical in Chicago was wholly unsuccessful in another town or city.

The soldering iron illustrated in the accompanying drawings and hereinafter described has proved thoroughly successful wherever it has been used. The reasons for its success where others have failed are necessarily more or less mystifying as no theory relating to gas consumption under widely varying conditions of quality and pressure appears to be reliable; hence, I can advance only guesses as to the reasons underlying the success of my structure.

The latter comprises the head 1 which is here shown to be cylindrical as best adapted for association with a soldering tip. Said head is provided with a central opening which is of smaller diameter in the outer than in the inner end of the head, the smaller diameter portion being indicated at 2 and the larger at 3, the latter being threaded throughout its entire length and said portion 2 being enlarged and threaded at opposite ends. A gas-delivery pipe 4 engages in the outer end portion of the part 2 or intake end of the said opening, and a delivery tip 5 is fitted to the discharge end of said portion 2 and projects into the larger portion 3. For convenience I shall term said portion 2 the gas-supply chamber and the portion 3 the mixing chamber of the device.

The tip 5 is cut from a hexagonal rod to provide a hexagonal peripheral portion 6 between its ends, the discharge end portion constituting a hollow cone the interior tapered surface of which constitutes a seat for the tapered end of the valve 7 which is reciprocable in the cylindrical bore of the shank of said tip 5 and the middle portion of the bore 2 which is of the same diameter as the bore of the shank of the tip 5. The conical end portion of said tip 5 is provided with a central opening 8 and the conical end portion of the valve 7 with a minute central opening 9, the body of said valve being hollow and open at its other end. At the meeting line of the conical and cylindrical portions of said valve 7 I provide an annular groove 10 by cutting away a part of the conical portion and provide a few equally spaced minute radial openings 11 connecting the said groove 10 with the hollow of said valve.

In the upper end portion of said valve there is a lateral slot through which the crank-pin 12 of a valve operating shaft 13 projects, said shaft 13 being provided between its ends with an annular flange 14 and in its outer end with a transverse slot 15 for engagement with a screw-driver. Said shaft lies in a radial opening 16 in the head 1 which is threaded in its outer end portion to receive the gland 17 between which and said flange 14, packing 18 is compressed, the said flange engaging an annular shoulder 19 bordering the smaller inner end portion of the opening 16, said packing providing a fluid-tight joint to prevent escape of gas. The gland 17 is provided with a slot 20 in its outer end for engaging a screw-driver. The packing 18 also serves to resist rotation of the shaft 13 and thus serves to hold the same sufficiently firmly at any point in its rotation to which it may be adjusted to fix the position of the valve 7 with respect to its seat to prevent accidental movement of said valve.

The head 1 is provided with a number of small longitudinal openings 21 extending from its outer end into the top of the mixing chamber 3 for supplying air to the latter which is drawn in by flow of gas through said chamber. Adjacent to its outer end the said head is provided with an annular groove 22 thus leaving an annular flange 23 at the said outer end. From the inner end of the head a plurality of longitudinal bores 24 lead into the said groove 22 for supplying air to the combustion chamber of the device which lies within the tube 25 telescopically associated at one end with said head 1 and carrying the soldering tip 26 at its other end, the latter being rigidly and permanently associated with said tube 25 in the manner shown and hereinafter described.

Threaded into the mixing chamber 3 is a member 27 which is equipped with a central internally threaded nozzle portion 28 and with a tapered bore 29 the smaller end portion of which terminates in the bore of the nozzle 28. The taper of the bore 29 differs from that of the conical end of the tip 5 so that upon approaching said tip 5 there will be a narrower annular space between the upper end of said member 27 and the opposed portion of said tip than between the discharge end of the latter and the opposed portion of bore 29. In this way the portion of said bore 29 disposed below the point of the tip 5 and which constitutes the actual mixing chamber for gas and air discharged from the nozzle 28 is proportioned to the gas and air supply passages leading to the same to effect proper mixture and permit expansion of gases under the influence of heat absorbed by said head. This relative taper of surfaces has been found to materially affect the successful operation of the device. The member 27 is very similar to a valve for varying the area of the air intake opening and also varying the size of the mixing chamber proportionately to the area of the air intake.

Mounted upon the outer end of the gas-supply pipe 4 is a cylindrical member 30 having a smooth bore of considerably larger diameter than the outer diameter of said pipe, said member being externally threaded at its outer end to receive the cap-nut 31. Extending freely through the central opening in the nut 31 is a tube 32 having a bent outer end portion 33 over which the discharge end of the gas supply hose 34 is fitted. In the outer face of the inner end of said tube 32 is an annular groove into which a split collar of wire is fitted to provide a stop for the slidable collar 36 mounted on said tube 32. Between the collar 36 and a similar collar 37, packing 38 is disposed, the opposed faces of said collars 36 and 37 being shown to be beveled but said beveling being unimportant. A helical compression spring 39 disposed between the collar 37 and the nut 31 serves to force said collar 37 toward the collar 36 to thereby bulge the packing 38 so that it will hug the opposed cylindrical surfaces between which it is disposed and thus provide fluid-tight joints to prevent passage of gas while permitting free rotation of said tube 32 relatively to the member 30, this being obviously necessary to permit free manipulation of the device without resistance due to twisting of the hose 34 which would occur but for the swivel-connection above described.

A collar 40 provided with an annular flange 41 is loosely mounted on the pipe 4, said flange being provided with a plurality of spacing projections 42 for maintaining it spaced from the flange 23 of the head 1. One of said projections 42 is provided with a reduced extension portion 43 engaging in an opening in the flange 23 for preventing rotation of the collar 40 relatively to the head 1. The diameter of the collar 40 coincides with that of the member 30, both thereof fitting the bore of a handle 44 disposed between the cap-nut 31 and the flange 41, a washer 45 of non-heat conductive material being disposed between the flange 41 and the opposed end of the handle 44 for preventing contact of the thumb of the operator with the flange 41 which becomes quite hot. The handle 44 and washer 45 may be advantageously made of ground-cork composition.

The portion of the head 1 which enters the tube 25 is of smaller diameter than the outer end portion so as to provide an annular shoulder 46 fixing the limit of relative movement of the tube 25 and head 1 in one direction. The tube is provided with a series of perforations 47 disposed at different distances from the adjacent end of the tube. A set-screw 48 in the head 1 is adapted to be passed through any one of the openings 47 to thereby vary the distance of the soldering tip 26 from the opposed end of the head 1 for reasons hereinafter pointed out.

It is very desirable that the total weight of the device should be maintained as low as possible and also that it should be capable of being manufactured at small cost and the perishable portions renewable at low cost. The tube 25 is one of the perishable parts and the tip 26 is the other, the tube requiring to be renewed quite as frequently as the tip 26. It is also requisite that the tube 25 and tip 26 should be so firmly united as to prevent any lost motion between them. The difference in coefficients of expansion of the copper of the tip and the steel of the tubing renders difficult the coupling of these parts in such manner as to prevent loosening under the conditions of use, the difficulty of machining copper adding to the problem. Furthermore, the tube 25 and tip 26 must be so constructed as to provide draft channels for the discharge of products of combustion and, because of the difficulty of machining the copper and the desirability of rendering it as dense as possible, the tip 26 must be designed for production by drop-forging.

The end portion of the tube 25 which is attached to the tip 26, is provided with preferably four recesses 49 having parallel side walls and angular end walls thereby providing four arms 50 at the end of the tube. The latter are provided at their free ends with lateral, substantially triangular projections 51 which are of greatest width at the extreme ends of said arms. Each of the latter is provided also with a perforation through which a projection 52 of the tip 26 is adapted to pass, the outer ends of said projections being then spread like rivets to secure the arms 50 to the tip. The latter is substantially square in cross-section, the corners 53 thereof being flattened or rounded to provide surfaces substantially equal in width to the middle portions of the arms 50. Between the flattened corner portions the tip is provided with the recesses 54 which are of greatest depth at the head of the tip 26 within the tube and vanish in the plane of the ends of the arms 50 substantially. By means of suitable equipment, the projections 51 of the arms 50 are bent inwardly with a force sufficient to embed them in the copper at the sides of the recesses 54 so that they alone would serve to prevent all play between said tip 26 and the tube 25. The projections 52 are, however, very desirable to aid in maintaining absolute rigidity of association under the influence of greatly varying temperatures and the corroding and eroding influence of chemicals employed in soldering.

The shape of the recesses 49 appears to be important it being obvious that the inner end portions of diametrically opposed recesses are thus offset from the main portions thereof. The perforations 55 between the innermost end portions of the recesses 49 also appear to be of importance.

The end of the tip 26 opposing the head 1 is slightly convex.

The operation of the device is as follows:
Gas fed from the hose 34 passes through tube 32 and pipe 4 into the valve-chamber within and above the tip 5. Assuming the valve 7 to be seated, the gas must pass through the central opening 9 of the valve 7 and the opening 8 of the tip 5 into and through the mixing chamber 3 and bore portions of the member 27 and nozzle 28. The velocity of the jet of gas, dependent upon the service pressure, causes the air in said chamber 3 to be mixed with gas and discharged therewith from the nozzle, thereby creating a partial vacuum in the mixing chamber and a consequent flow of air into the same through the passages 21 which, it will be noted, are parallel with the direction of flow of the gas.

Where the pressure is low and the gas is lean of carbon, the removable tip 56 of Fig. 2 or 57 and 58, respectively, of Figs. 8 and 9 is omitted and the member 27 projected somewhat farther outwardly than is shown in Fig. 2 to thus provide for free flow of air into the mixing chamber and minimum resistance to discharge of the mixed air and gas from the nozzle 28 into and through the combustion chamber of the tube 25. A sufficient amount of air is thus admixed with the gas to produce a blue flame which is substantially cylindrical in form and impinges against the center of the head of the tip 26 without spreading materially from the area of impingement. In flowing through the combustion chamber the jet of burning fluid produces a flow of air in the same direction for discharge through the openings 49 and recesses 54, the discharged air being replaced by flow through the passages 24 which are also parallel with the direction of flow of the gas. This relative arrangement of air passages with respect to direction of flow of gas together with the number and diameters of said passages appears to be of great importance to the success of the structure. The number, size and relative positions of the passages 24 must, apparently, be very carefully gauged in order to prevent back-flow of gases or products of combustion when the jet of flame projects downwardly or to produce sufficient resistance to flow of air into the combustion chamber to appreciably retard the velocity of flow of the combustible and burning gas, it being observed that the gross length of the jet of flame is substantially the same when projected downwardly as when projected horizontally or upwardly. The importance of this to maintain uniformity of heat absorption by the tip 26 at all times will be instantly obvious.

The adjustment of the member 27 affects the combustible mixture and the distance of the head of the tip 26 from the end of the nozzle 28 determines the degree to which said tip will be heated, the degree being less as the distance is increased.

Where the gas-pressure is higher or the gas is richer or both, one of the several tips 56, 57 or 58 is employed, each of said tips producing different results to a greater or less degree than the others with respect to force of blast, proportion of air admixed with the gas, etc. The results can be greatly varied by adjusting the member 27 to increase or decrease the size of the mixing chamber; adjusting the particular tip employed with respect to extent of its projection from the nozzle 28; and, of course, by adjustment of the valve 7. The range of adjustments is so wide and the conditions requiring them so varied as to render a full account thereof too long to be permissible in a patent specification.

It will be noted that the bore of the tip 56 is of the same diameter throughout while that of the tips 57 and 58 is enlarged at the discharge end, the mouth portion of the tip 58 being also provided with radial recesses 59 to permit lateral passage of air into the enlarged mouth portion for admixture with the combustible fluid, the tip 58 being particularly adapted for gas rich in carbon.

It will be observed that when the valve 7 is seated the flow of gas will be limited to the capacity of the opening 9 but when moved from its seat additional gas will be supplied through the radial openings 11, the gas being equally distributed by means of the groove 10 and cone-shaped passage leading to the opening 8. The central jet through the opening 9 serves to cause the additional gas to flow in a substantially cylindrical and accurately directed stream through the mixing chamber and from the nozzle 28 and the tip 56, 57 or 58 thereof should any of the latter be used.

By removing the tube 25, the device may be employed as a pre-heating or other torch but its greatest merit lies in its association with the tube 25 and tip 26, the latter being exemplary of the element of any kind to be maintained constantly at a substantially fixed high temperature.

It is very necessary, in the case of soldering irons, that the soldering tip shall be rotatable in order to equally distribute wear on the point thereof. Hence, the swivel connection with the gas feed hose is essential and it is quite as essential that the handle 44 should be non-rotatable relatively to pipe 4 or tip 26. Confining the handle 44, under pressure, between the nut 31 and spacing flange 41 might serve but it is preferable to provide a very snug fit between the collar 40 and the bore of the handle 44 and between the latter and the member 35 for frictionally resisting rotation of the handle.

The hose 34 is connected at its other or intake end with a valve controlled gas outlet, the valve of which requires to be adjusted to vary the feed to the hose in all instances where the service pressure exceeds a certain degree, that degree depending upon the richness of the gas delivered from the service pipes. The valved service outlet is omitted from illustration because it is a matter of common knowledge that every service outlet is valve controlled.

It will be obvious, of course, that the range of adjustments provided is such as to permit a jet of flame of such length, diameter and color (with respect to such practically perfect combustion of fuel gas as will obviate soot and generation of carbon-monoxide) as is adapted to maintain the element 26 at the desired temperature, utilizing such quality of gas as may be available to the operator at whatever pressure the same is delivered from the service pipes. Variations in service pressures at such times of day in which consumption is greatest, are generally compensated for by adjusting the service outlet valve to the hose 34.

I claim as my invention:—

1. A device of the kind specified comprising a combustion chamber, an element to be heated mounted at one end thereof, a member mounted at the other end thereof provided with air supply passages for connecting said combustion chamber with atmosphere, a central mixing chamber in said member having a central discharge duct into said combustion chamber, there being a central gas intake opening at the other end of said mixing chamber, a valve-seat bordering one end of said opening, a valve seating on said valve-seat for controlling the volume of gas fed to said mixing chamber, air passages connecting the gas-intake end of the latter with atmosphere, and a member adjustable in the discharge end of said mixing chamber for coaction with the said valve-seat for controlling the volume of air admitted to said mixing chamber.

2. A device of the kind specified comprising an intermediate cylindrical member having a plurality of sets of air passages extending longitudinally thereof, an axially disposed mixing chamber associated with one set of said air passages, a gas supply pipe connected with one end of said mixing chamber, a valve associated with said pipe for controlling the volume of gas entering said mixing chamber, a discharge opening in the other end of the latter, a combustion chamber disposed to receive gas discharged from said mixing chamber and air passing through the other set of air passages, an element to be heated disposed at the other end of said combustion chamber, there being coacting openings in the wall of the combustion chamber and recesses in the element to be heated for discharge of products of combustion, means for varying the distance of the element to be heated from the point of discharge of gases from the mixing chamber, a handle disposed about the gas feed pipe, connection between the latter and a source of supply of gas, means for preventing relative longitudinal and rotary movement between said handle and said pipe, and a spacing element between said handle and said intermediate member for permitting free access of air to said air passages.

3. A device of the kind specified comprising an intermediate cylindrical head provided with a central mixing chamber, a gas supply pipe connected with one end of said mixing chamber, a valve intermediate the ends of the latter for controlling the supply of gas to the same, a plurality of longitudinal air passages connecting the intake end portion of said chamber with atmosphere, a valve element in the discharge end of said chamber operatively associated with said air passages for controlling the volume of air admitted to said chamber, a central discharge opening in said valve-member, a gas-discharge tip longitudinally adjustable in said discharge opening, a combustion chamber disposed to receive gases from said mixing chamber, an element to be heated mounted at the far end of said combustion chamber, a plurality of longitudinal air passages in said head connecting the receiving end of said combustion chamber with atmosphere, a handle mounted on said gas supply pipe, connection between the latter and with a source of gas, a spacing member for spacing said handle from said head and maintaining the same non-rotatable relatively to the latter, and a nut on the other end of said pipe for compressing the handle against said spacing member.

4. In a device of the kind specified, a tube constituting the combustion chamber, said tube terminating in a plurality of projections equally spaced from each other and each provided with a perforation, a soldering tip provided at one end with recesses bordered by surface portions corresponding in number with said projections and each equipped with a raised portion for passing through one of said perforations and overturned upon the outer faces of said projections for permanently securing the latter to said tip.

5. In a device of the kind specified, a tube constituting the combustion chamber, said tube terminating in a plurality of projections equally spaced from each other and each provided with a perforation between its side edges and with ears at its side edges, a soldering tip provided at one end with recesses bordered by surface portions corresponding in number with said projections and each equipped with a raised portion for passing through one of said perforations and overturned upon the outer faces of said projections for permanently securing the latter to said tip, said ears bent over and embedded in the walls of said recesses for coaction with said overturned raised portions for permanently coupling said tip with said tube.

6. A devise of the kind specified including a combustion chamber, an element to be heated mounted at one end thereof, air passages discharging into the other end thereof, a mixing chamber having a central discharge opening leading into the last-named end portion of the combustion chamber axially of the latter, air passages discharging into the other end of the mixing chamber, a gas-chamber disposed to discharge into the last-named end portion of the mixing chamber, there being a gas duct connecting the gas and mixing chambers centrally of both said chambers and axially aligned with the first-named discharge opening, a tapered surface bordering the gas-duct, the discharge end wall of the mixing chamber having an inner tapered face opposing the tapered surface bordering the gas-duct and said wall adjustable to vary the distance between said tapered surfaces to thereby vary the size of said mixing chamber and vary the volume of air admitted to the latter.

7. A device of the kind specified including a combustion chamber, an element to be heated mounted at one end thereof, air passages discharging into the other end thereof, a mixing chamber having a central discharge opening leading into the last-named end portion of the combustion chamber axially of the latter, air passages discharging into the other end of the mixing chamber, a gas-chamber disposed to discharge into the last-named end portion of the mixing chamber, there being a gas-duct connecting the gas and mixing chambers centrally of both said chambers and axially aligned with the first-named discharge opening, a tapered surface bordering the gas-duct, the discharge end wall of the mixing chamber having an inner tapered face opposing the tapered surface bordering the gas-duct and said wall adjustable to vary the distance between said tapered surfaces to thereby vary the size of said mixing chamber and vary the volume of air admitted to the latter, and a valve controlling the said gas-duct.

8. A device of the kind specified including a combustion chamber, an element to be heated mounted at one end thereof, air passages discharging into the other end thereof, a mixing chamber having a central discharge opening leading into the last-named end portion of the combustion chamber axially of the latter, air passages discharging into the other end of the mixing chamber, a gas-chamber disposed to discharge into the last-named end portion of the mixing chamber, there being a gas-duct connecting the gas and mixing chambers centrally of both said chambers and axially aligned with the first-named discharge opening, a tapered surface bordering the gas-duct, the discharge end wall of the mixing chamber having an inner tapered face opposing the tapered surface bordering the gas-duct and said wall adjustable to vary the distance between said tapered surfaces to thereby vary the size of said mixing chamber and vary the volume of air admitted to the latter, and a valve having a central duct and surface grooves arranged to control the volume of gas passing through said gas-duct in excess of a substantially predetermined minimum volume.

9. A device of the kind specified including a cylindrical combustion chamber having exhaust openings at one end, an element to be heated mounted at said end of said chamber, a cylindrical member closing the other end of said chamber and having an axially disposed gas passage and mixing chamber respectively communicating with each other through an axial duct, two sets of longitudinal air passages in said cylindrical member arranged around and spaced from the gas passage, one set connecting the intake end of the combustion chamber and the other set connecting the intake end portion of the mixing chamber with atmosphere, a member adjustably disposed in the discharge end of the mixing chamber and having a central duct connecting the latter with the combustion chamber, said adjustable member coacting with the discharge end wall of the gas chamber and the volume of air admitted to the latter through the air passages associated with the mixing chamber.

10. A device of the kind specified including a cylindrical combustion chamber having exhaust openings at one end, an element to be heated mounted at said end of said chamber, a cylindrical member closing the other end of said chamber and having an axially disposed gas passage and mixing chamber respectively communicating with each other through an axial duct, two sets of longitudinal air passages in said cylindrical member arranged around and spaced from the gas passage, one set connecting the intake end of the combustion chamber and the other set connecting the intake end portion of the mixing chamber with atmosphere, a member adjustably disposed in the discharge end of the mixing chamber and having a central duct connecting the latter with the combustion chamber, said adjustable member coacting with the discharge end wall of the gas chamber and the volume of air admitted to the latter through the air passages associated with the mixing chamber, and a valve controlling the last-named duct.

11. In a heating device, a combustion chamber, a gas chamber and a mixing chamber, the latter disposed between the gas and combustion chambers, there being ducts axially aligned with each other and disposed axially of said several chambers connecting the gas chamber with the mixing chamber and the latter with the combustion chamber, air ducts disposed parallel with each other connecting the combustion and mixing chambers respectively with atmosphere, and means for adjusting the length of the mixing chamber and simultaneously therewith controlling the supply of air thereto from the air passages associated with the same.

12. In a heating device, a combustion chamber, a gas chamber and a mixing chamber, the latter disposed between the gas and combustion chambers, there being ducts axially aligned with each other and disposed axially of said several chambers connecting the gas chamber with the mixing chamber and the latter with the combustion chamber, air ducts disposed parallel with each other connecting the combustion and mixing chambers respectively with atmosphere, and means for adjusting the length of the mixing chamber and simultaneously therewith controlling the supply of air thereto from the air passages associated with the same, and a valve controlling the duct connecting the gas and mixing chambers.

13. A device of the kind specified including a cylindrical combustion chamber and a mixing chamber connected with each other by means of an axial opening, a gas feed passage connecting the mixing chamber with a source of fuel gas, through an opening axially aligned with said first-named opening, and two sets of air passages parallel with the axis of said chambers and arranged around the mixing chamber, one set of said air passages connecting the combustion chamber and the other set connecting the mixing chamber with atmosphere.

14. A device of the kind specified including a cylindrical combustion chamber and a mixing chamber connected with each other by means of an axial opening, a gas feed passage connecting the mixing chamber with a source of fuel gas, through an opening axially aligned with said first-named opening, and two sets of air passages parallel with the axis of said chambers and arranged around the mixing chamber, one set of said air passages connecting the combustion chamber and the other set connecting the mixing chamber with atmosphere, and a valve controlling the gas feed opening for said mixing chamber.

15. In a device of the kind specified, a mixing chamber having an adjustable discharge end wall for longitudinally contracting and enlarging said chamber, air supply ducts connecting the other end of said chamber with atmosphere, and means opposed to the inner end of said adjustable wall and coacting therewith to effect decrease of air supply to said chamber as the latter is contracted and vice versa.

16. In a device of the kind specified, a cylindrical mixing chamber having an adjustable discharge end wall for increasing and decreasing the length of said chamber, a member having a gas feed opening disposed in the intake end of said chamber, air passages connecting the latter with atmosphere disposed to discharge into said chamber around said member, the latter and said adjustable end wall coacting to control the supply of air to said chamber proportionately to increase and decrease in length of the latter.

17. A device of the kind specified including a cylindrical tube constituting a combustion chamber, an element to be heated rigidly and non-adjustably mounted at one end thereof, a cylindrical member telescopically associated with the other end thereof, central gas supply and mixing chambers in said member, the latter discharging axially into said combustion chamber, longitudinal air passages in said member arranged around said mixing chamber for connecting the combustion chamber with atmosphere, and means for detachably and adjustably associating said tube with said member for varying the length of said combustion chamber.

18. A device of the kind specified including a burner member having a central mixing chamber at one end and a gas supply passage for the latter in its other end, two sets of longitudinal air passages in said member arranged around and spaced from said mixing chamber and supply passage, one set thereof connecting the inner end of the mixing chamber with atmosphere, a handle element mounted upon the said member around the supply passage, there being an annular groove in said member between the handle element and the portion thereof containing said air passages and communication with all of the latter.

19. A soldering iron of the kind specified including a tube equipped at one end with a head to be heated, said tube provided at said end with a plurality of recesses each having in part parallel walls constituting the side edges of arms to which said head is secured, one of said walls of each recess extending inwardly toward the other end of the tube a greater distance than the other of said walls the remaining wall of said recess being angularly disposed.

20. A soldering iron of the kind specified including a tube equipped at one end with a head to be heated, said tube provided at said end with a plurality of arms having parallel side walls extending parallel with the longitudinal axis of said tube, there being draft recesses in said tube behind said head bordered in part by said side walls, one of the latter being longer than the other, and a diagonally disposed wall connecting the inner ends of said parallel walls, said diagonal walls at diametrically opposed parts of said tube being oppositely disposed.

21. A soldering iron of the kind specified including a tube equipped at one end with a head to be heated, said tube provided at said end with a plurality of arms having parallel side walls extending parallel with the longitudinal axis of said tube, there being draft recesses in said tube behind said head bordered in part by said side walls, one of the latter being longer than the other, and a diagonally disposed wall connecting the inner ends of said parallel walls, said diagonal walls at diametrically opposed parts of said tube being oppositely disposed, there being a perforation in said tube adjacent each of said diagonal walls.

22. In a soldering iron of the type specified, a tube equipped at one end with a head to be heated and constituting the combustion chamber of the device, there being two pairs of draft openings in said tube adjacent said head, the openings of each pair being diametrically opposed to each other and relatively arranged so that, when the tube is horizontally disposed, only a small portion of each of the area of a pair of said openings will be in vertical alignment with a similar portion of the other of said pairs to thereby prevent in part the deflection of flame by updraft through said pairs of openings 23. In a soldering iron of the type specified, a tube equipped at one end with a head to be heated and constituting the combustion chamber of the device, there being two pairs of draft openings in said tube adjacent said head, the openings of each pair being diametrically opposed to each other and relatively arranged so that when the tube is horizontally disposed, only a small portion of each of the area of a pair of said openings will be in vertical alignment with a similar portion of the other of said pairs to thereby prevent in part the deflection of flame by updraft through said pairs of openings, there being a perforation in said tube adjacent each of said draft openings arranged to be out of vertical alignment with each other when said openings are in part vertically aligned as aforesaid.

IRVING COWLES.